April 9, 1963 R. E. HYDE 3,084,890
AIRPLANE LIQUID-SPRAYING UNIT
Filed April 16, 1959 2 Sheets-Sheet 1

INVENTOR.
RICHARD E. HYDE
BY
ATTORNEY.

April 9, 1963

R. E. HYDE 3,084,890

AIRPLANE LIQUID-SPRAYING UNIT

Filed April 16, 1959

2 Sheets-Sheet 2

INVENTOR.
RICHARD E. HYDE
BY
ATTORNEY

United States Patent Office 3,084,890
Patented Apr. 9, 1963

3,084,890
AIRPLANE LIQUID-SPRAYING UNIT
Richard E. Hyde, Dos Palos, Calif.
Filed Apr. 16, 1959, Ser. No. 806,854
4 Claims. (Cl. 244—136)

This invention relates to an airplane liquid-spraying unit.

When crops are sprayed with liquid insecticides, fungicides, etc., better and more uniform coverage is obtained and less liquid is wasted when the liquid falls on the leaves in an even pattern and in droplet size, instead of being dispersed in a fog or very fine mist. The importance of the even pattern is that an exact amount of the material is required on each square foot of the area to be treated. The importance of the droplet size stems from the fact that large drops tend to touch only part of the plant, while particles of liquid in a very fine mist tend to evaporate and to be blown away as they fall, so that some of the liquid never reaches the leaves of the crop being sprayed, and in gusty weather the distribution is uneven. So it takes less liquid to do the same job and the job is done better when the spray is in an even pattern with its particles in droplet size.

Conventional airplane spraying units suffer from the fact that the whirling of the propeller and the passage of the wings and other parts of the plane through the air create air-flow patterns that adversely affect the evenness of the spray pattern and the size of the liquid particles in the spray. The propeller blast moves air from one side of the airplane to the other, the direction of flow depending on the direction of rotation of the propeller, and the air movement at the wing tip is in a vortex from the lower surface of the wing, where the air has greater density, around the wing tips to the upper surface of the wing, where the air has less density. Where the two varying air pressures meet, there is circular air movement, like a cyclone along a horizontal axis. These air movements tend to make the spray pattern uneven and to break up the sprayed particles, particularly at the wing tips. Thus the spray is dispersed unevenly and in the form of a very fine mist.

The present invention avoids subjecting the spray droplets to this air disturbance by issuing the spray droplets at a level below the disturbance. The spray material is not blown away by the propeller blast or by the air currents created thereby, nor is it affected by the vortex created by the outward movement of air along the wing. This makes it possible to reduce the liquid dosage per acre, both because of the resultant evenness of application and because far less is blown away.

Moreover, the present invention provides an assembly wherein the spray tubes can be raised and lowered, so that they can extend down low when spraying and can be lifted at other times so as not to interfere with the landing operation of the plane.

Another feature of the invention is its use of the motion of the airplane through the air to help lower the nozzles to their spraying position and to hold them there.

Other objects and advantages of the invention will appear from the following description of a preferred embodiment thereof.

In the drawings:

FIG. 1 is a perspective view of an airplane spraying unit embodying the principles of the invention, shown in its spraying position, with the airplane flying.

FIG. 2 is a fragmentary view in side elevation of a portion of the airplane of FIG. 1, showing the spraying nozzles in their raised or retracted position, and also showing the lever system for rotating them and the boom which supports them.

FIG. 3 is a view in side elevation and partly in section, on an enlarged scale, of the rotatable boom and the spraying nozzles which are supported by the boom.

FIG. 4 is a perspective view of the spraying apparatus removed from the airplane and including the spray boom, the spray nozzles, a portion of the spray container tank, and the pump system, together with a portion of controls for the boom position and for the valves.

FIG. 5 is a fragmentary view in side elevation, enlarged with respect to FIG. 2, showing the two principal positions of the spray nozzles. Solid lines show the nozzles in their lower, spraying position, and broken lines show their raised, normal-flight, non-spraying position.

FIG. 1 shows an airplane 10 with a fuselage 11. The plane 10, illustrated for example only, is a biplane with a lower wing 12 and an upper wing 13. The fuselage 11 has a cockpit 14 for the pilot and, at its nose, an engine 15 and a propeller 16. The airplane 10 also has a landing gear 17 with wheels 18 and, in conformance with conventional crop-spraying planes, this landing gear 17 is preferably not retractable.

An important problem solved by the present invention relates to the fact that the propeller draft creates strong air currents that tend to break up liquid droplets. Also, the outward movement of air along the wing 12 creates a kind of vortex. The resultant turbulence affects the air adjacent the wings and propeller for a substantial distance below and above, so that where the spray nozzles are located closely adjacent to the wing, the spray is ejected into the turbulent airstream and broken up, thereby impairing the efficiency of the operation.

In the present invention, the spray unit (see FIG. 4 especially) includes a rotatable hollow boom or manifold 20 from which project a series of nozzle tubes 21 of substantial length. In their normal, non-spraying position these nozzles tubes 21 extend generally horizontally and rearwardly from the boom 20 as in FIGS. 2–4 and in broken lines in FIG. 5, but in spraying position they extend downwardly to a point beyond the area of turbulence adjacent the wings and preferably below the landing gear 17 and its wheels 18, as shown in FIG. 1 and in solid lines in FIG. 5.

The boom 20 may be supported from the lower surface of the wing 12 and below the fuselage 11 by a series of vertical columns 22 with supporting brackets 23 secured to their upper end and to the lower surface of the wing 12. Also, adjacent the outer ends of the boom 20 there may be bent columns 24 that are secured to upper wing 13, for additional support. Collars 25 are clamped securely around the boom 20 and are provided with cranks 26 which are pivotally secured to the lower ends of the columns 22 and 24 by pintles 27, so that the boom 20 is rotatable about 90° relative to its supporting columns 22 and 24.

As shown in FIG. 2, a lever handle 28 is supported at one side of the fuselage 11 adjacent the cockpit 14 where the pilot can easily control it manually. The lever 28 is connected by links 29 and 30 and a cable 31 pivotally to a crank 32 that is secured rigidly to the rotatable boom 20. The lever 28 is provided with a lock 33 normally holding it in its rearward position when the crank 32 and nozzles 21 are horizontal.

A pair of vanes 34 are attached at the outer ends of rods 35, which are rigidly attached to the boom 20. When the pilot releases the lever handle 28 from the lock 33 and moves it forward, the vanes 34 begin to lift from their normally horizontal position (FIG. 4) and to intercept the wind. The force exerted against them by the wind helps to rotate them and the boom 20 to their upward, nearly vertical, position (FIG 1) in which the nozzles 21 are in their lower position with their tips 36 below the turbulent area. The pilot can raise the boom 20 simply by pulling the handle 28 back, thereby lowering the vanes 34 to their horizontal position and placing the nozzles 21 horizontal. The vanes 34 also help inform the pilot whether the nozzles 21 are up or down.

Figure 2:
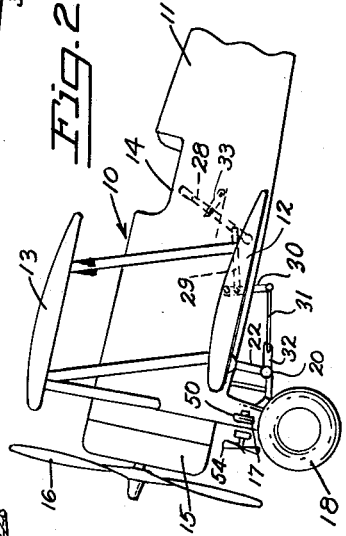
Figure 1:
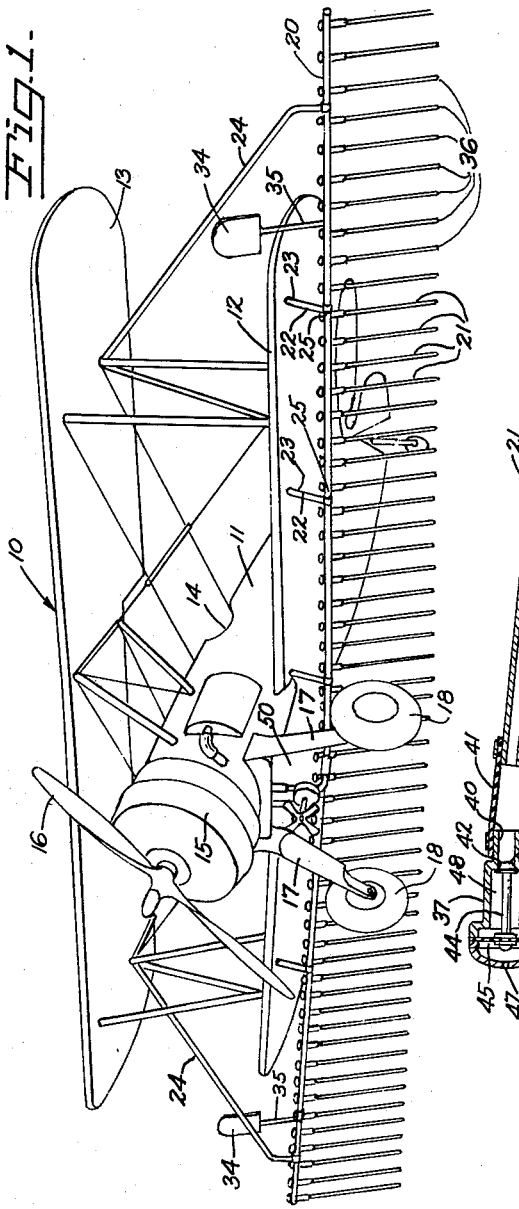
Figure 3:
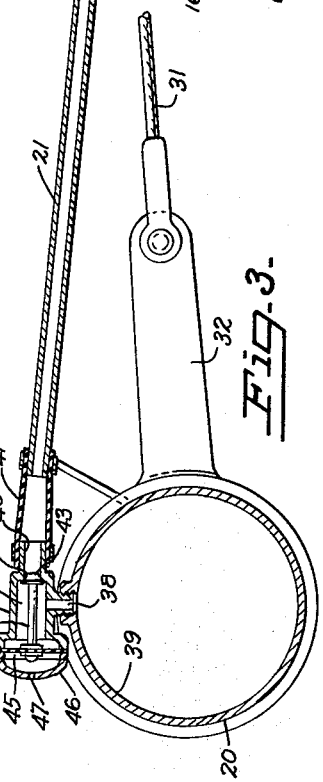
Figure 4:
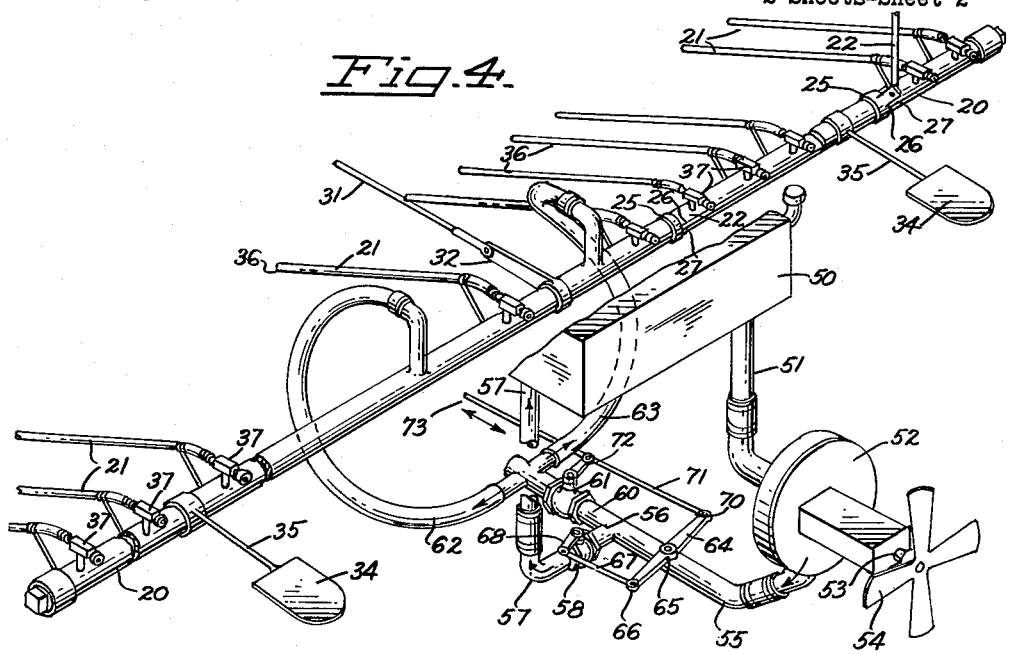
Figure 5:
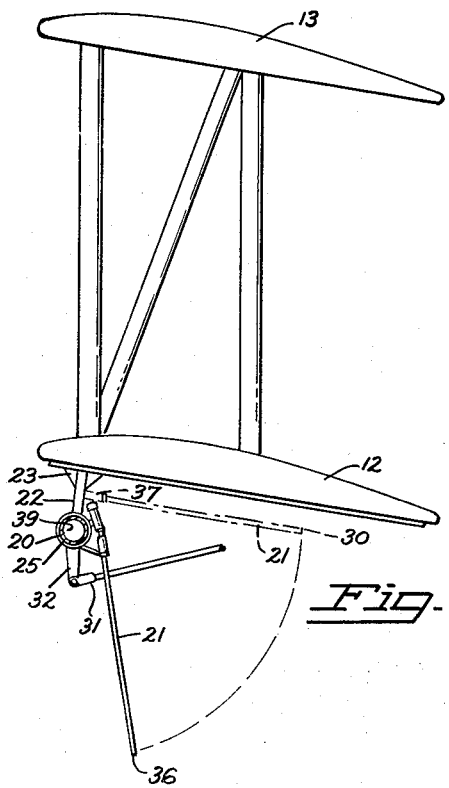

It will be noted, particularly from FIG. 3, that instead of merely connecting the nozzle tubes 21 directly to the manifold boom 20, the connection is made through a valve 37. The valve 37 includes an inlet fitting 38 that is connected to the interior passage 39 of the manifold boom 20, and an outlet fitting 40 that is connected to the nozzle tube 21 by a short connecting tube 41. Adjacent the outlet 40 is a valve seat 42 against which a movable valve member 43 closes when the valve 37 is in its closed position. The valve closure member 43 is connected by a stem 44 to a diaphragm 45. A perforate cover member 46 protects the atmospheric side of the diaphragm 45, and an opening 47 through the cover 46 affords maintenance of atmospheric pressure air on one side of the diaphragm 45. From this it will be obvious that atmospheric pressure always tends to move the diaphragm 45 to a position where the valve member 43 rests against the seat 42 and therefore closes the valve 37. However, when fluid under pressure (i.e., the liquid to be sprayed, when it is being pumped) enters the inlet 38 it flows into a chamber 48 and, as pressure builds up, counteracts the atmospheric pressure on the diaphragm 45 and therefore opens the valve 37 by moving the closure member 43 away from the seat 42. This arrangement assures that there will be no dripping of liquid through the nozzles 21 when no spraying is being done.

The spray solution itself is preferably retained in a tank 50 having an outlet tube 51 that leads to a pump 52 whose pump element is connected by a shaft 53 to a fan 54. The fan 54 is driven by air when the airplane 10 is in flight, and its rotation operates through the pump 52. In other words, the pump 52 is driven by the movement of the plane 10 through the air, so that no separate motor is needed and there is no extra load on the airplane engine 15.

From the pump 52 an outlet tube 55 leads to a T 56, whence one conduit 57 leads via a valve 58 back to the tank 50. Another conduit 60 leads to a valve 61 and from there through tubes 62 and 63 into the manifold-boom passage 39.

A lever 64 is preferably mounted by a center pivot 65 on the tube 55. One end 66 of the lever 64 is connected by a link 67 to a crank 68 which opens and closes the valve 58. The other end 70 is connected by a link 71 to a crank-arm 72 which opens and shuts the valve 61. The levers and links are arranged to open the valve 61 when the valve 58 is closed and vice versa. Moreover, the link 71 is connected by a cable 73 to a control member (not shown) in or adjacent the cockpit 14. When the valve 58 is open, the valve 61 is closed, so that the pump 52 then merely circulates the spray liquid from the bottom of the tank 50 around and back into the tank 50, via conduits 51, 55, and 57. This enables the pump 52 to operate all the time. It also helps to keep the spray solution mixed and, by maintaining circulation, makes it possible to eliminate parts. However (when the nozzle tubes 21 have been moved to their downwardly extending position), the lever system may be operated to close the valve 58 and open the valve 61, so that the pump 52 then pumps liquid from the tank 50 into the boom 20. As pressure builds up inside the boom passage 39, the liquid forces open the valve 37 and the liquid then passes into the nozzles 21 and is dispensed from the lower end 36 of the nozzles 21.

In operation, therefore, the airplane spraying unit is normally disposed with the valve 58 open, the valve 61 closed, and the nozzles 21 in their horizontal position. When the plane 10 takes off, everything remains in this position, but as the plane 10 gathers speed, air drives the fan 54 and therefore operates the pump 52 which, at this time, merely returns the liquid to the tank 50. The pilot prepares to spray by unlocking the lever handle 28 from the latch 33 and moves the handle 28 forward. The vanes 34 then assist in rotating the boom 20 to move the nozzles 21 down. When the nozzles 21 are in the spraying position, the cable 73 is used at the beginning of each run to open the valve 61 and close the valve 58 and so send liquid under pressure into the boom 20. The pressure of the liquid in the boom passage 39 opens the valve 37 and sends liquid out to the nozzles 21, where it falls off the lower tips 36. There is no need to provide any special venturi action or anything at the tips of the nozzles, because the sweep of the wind at the end of the nozzles seems to draw the liquid out in the desired form. At the end of each run, the lever system is operated by the cable 73 to close the valve 61 and open the valve 58.

At the end of the spraying operation, the boom 20 is rotated by the handle 28 back to place the tubes 21 in their horizontal position, prior to landing the airplane.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An airplane spraying unit including in combination an airplane having a wing, a fuselage, and landing gear; a hollow boom of substantial length rotatably supported by said airplane below said fuselage and below and parallel to said wing; means for pumping spray solution into said boom under pressure; a series of nozzle tubes connected to said boom and extending transversely thereto; and means for rotating said boom from a position where said nozzle tubes are generally horizontal and above said landing gear to a position where said nozzle tubes extend downwardly to a level below said landing gear and below the turbulent airstream provided by the wing and landing gear when said airplane is in flight.

2. An airplane spraying unit for an airplane having a wing, a fuselage, and a landing gear comprising a laterally extending spray means of substantial length movably supported by said airplane above said landing gear, below said fuselage, and below and generally parallel to said wing, said spray means having a series of orifice means; a stationary storage tank for spray solution; means for pumping spray solution from said tank to said orifice means under pressure; and pivotally mounted means for rotating the position of said orifice means from a position above said landing gear to a position below said landing gear and for holding them in each of said positions.

3. An airplane spraying unit including in combination an airplane having a wing and a fuselage; a hollow boom rotatably supported by said airplane below said fuselage and below and parallel to said wings; means for pumping spray solution into said boom under pressure; a series of nozzle tubes of substantial length connected to said boom and extending transversely thereto; and means for rotating said boom from a position where said nozzle tubes extend rearwardly and generally horizontal to a position where said nozzle tubes extend downwardly, said means for rotating said boom including a mechanical lever system and vane means secured to said boom opposite to said nozzle tubes so as to be substantially horizontal when they are horizontal and vertical when they are vertical, said vane means assisting said mechanical lever system in lowering said nozzle tubes by utilizing the air force thereagainst and also assisting in maintaining said nozzle tubes in their downward position.

4. An airplane spraying unit including in combination an airplane having a wing, a fuselage, and a landing gear; a hollow boom rotatably supported by said airplane above said landing gear, below said fuselage, and below and parallel to said wing; a storage tank for spray solution; means for pumping spray solution from said tank under pressure; a series of pressure-operated check valves on said boom; a series of nozzle tubes of substantial length, each connected to a said check valve and extending transversely to said boom; and means for rotating said boom from a position where said nozzle tubes extend generally rearwardly and above said landing gear to a position where the outboard ends of said nozzle tubes extend downwardly below said landing gear, said means for rotating said beam including a mechanical lever system and vane means secured to said boom opposite to said nozzle tubes so as to be substantially horizontal when they are horizontal and vertical when they are vertical, said vane means assisting said mechanical lever system in lowering said nozzle tubes by utilizing the air force thereagatinst and also assisting in maintaining said nozzle tubes in their downward position.

References Cited in the file of this patent

UNITED STATES PATENTS

| | | |
|---|---|---|
| 1,187,981 | Doucette | Jan. 20, 1916 |
| 2,504,580 | Pierson | Apr. 18, 1950 |
| 2,665,092 | Sands | Jan. 5, 1954 |
| 2,772,061 | Sellers | Nov. 27, 1956 |

FOREIGN PATENTS

| | | |
|---|---|---|
| 225,884 | Great Britain | Oct 15, 1925 |
| 54,300 | Denmark | Feb. 7, 1938 |

OTHER REFERENCES

Aviation Week Magazine, Jan. 7, 1952, vol. 56, No. 1, page 15.